(12) United States Patent
Lee

(10) Patent No.: US 7,073,091 B2
(45) Date of Patent: Jul. 4, 2006

(54) METHOD AND SYSTEM FOR UPDATING MAPPING FLAG IN OPTICAL RECORDING MEDIUM

(75) Inventor: Ming-Hung Lee, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 639 days.

(21) Appl. No.: 10/390,632

(22) Filed: Mar. 19, 2003

(65) Prior Publication Data

US 2004/0064754 A1    Apr. 1, 2004

(30) Foreign Application Priority Data

Oct. 1, 2002    (TW) ............................... 91122603 A

(51) Int. Cl.
*G06F 11/00* (2006.01)

(52) U.S. Cl. .................... 714/8; 369/53.17

(58) Field of Classification Search .............. 714/8, 714/7, 6; 369/30.04, 53.17

See application file for complete search history.

(56) References Cited

U.S. PATENT DOCUMENTS 5,526,335 A * 6/1996 Tamegai ................. 369/53.16
2001/0021983 A1 * 9/2001 Ono et al. ................ 714/8
2004/0073832 A1 * 4/2004 Ko ............................ 714/8
2005/0166088 A1 * 7/2005 Yamagami et al. ......... 714/8

* cited by examiner

*Primary Examiner*—Robert Beausoliel
*Assistant Examiner*—Marc Duncan
(74) *Attorney, Agent, or Firm*—Troxell Law Office, PLLC

(57) ABSTRACT

This invention is for updating a straight mapping flag in an optical recording medium having defect table blocks (DTBs) in a detect table (DT). When data that should be recorded in a predetermined block in one data area is later recorded in a replacement block in one spare area because the predetermined block is defective, record associated information in a entry in one DTB, and the entry is marked as recorded and sequentially arranged. Determine an examining sequence of the DTBs with a predetermined block-sequence determination procedure and perform a predetermined block-examining procedure to the DTBs one by one with the determined examining sequence. Examine whether the DTB comprises any recorded entries. Examine the recorded entries with a predetermined entry-examining procedure, to acquire the associated information of the defective blocks in recorded entries and update the corresponding straight mapping flag to be non-straight mapping based on the acquired associated information.

18 Claims, 5 Drawing Sheets

METHOD AND SYSTEM FOR UPDATING MAPPING FLAG IN OPTICAL RECORDING MEDIUM

BACKGROUND OF THE INVENTION

1. Field of the Invention

The present invention relates to a data updating method, and more particularly, the present invention relates to a method for updating a straight mapping flag in an optical recording medium.

2. Description of the Prior Art

A conventional CD-RW (Compact Disk-Rewritable) comprises a defect table (DT). When a CD-RW drive writes or reads a defective block in the disk, a replacement block can be found through the DT, which makes the disk more reliable.

Referring to FIG. 1, FIG. 1 is a schematic diagram of file arrangement for a conventional CD-RW 10. The CD 10 comprises at most 64 defect management areas (DMA) sequentially arranged and stored in the middle part 16 of the CD-RW 10. The CD-RW 10 also comprises a main detect table and a second defect table respectively stored in the lead-in Area 12 in the inner part of the CD-RW 10 and the program area 14 in the outer part of the CD 10.

Each of the DMAs comprises a data area (DA) and a spare area (SA). Therefore the CD-RW 10 comprises at most 64 DAs and 64 SAs. Conventionally, the DA comprises 4352 blocks for recording digital data, and the SA comprises 256 blocks as substitutes for the blocks in the DA to record the digital data when they are defective. Each of the blocks has a corresponding address for identification.

The data in the second defect table are duplicated from that in the main defect table, and hence both main and second detect tables are called as detect table (DT) 18 in the following description. The DT 18 comprises at most eight packets 19. Each packet 19 comprises four defect table block set (DTBS) 22, 24, 26, 28 arranged in a specific sequence. Each of the DTBSs 22, 24, 26, 28 comprises 8 defect table blocks (DTBs) 20. The four DTBS are used to repeatedly record the 8 DTBs 20. Therefore, the DT 18 totally comprises at most 64 DTBs corresponding to at most 64 SAs. Each of the DTBs 20 comprises a plurality of entries 30. The number of entries 30 is predetermined. Each of the entries 30 respectively corresponds to each of the 256 blocks of the SA. The entries are used to record the recording status of blocks in the corresponding SA and the address of the detective blocks of the substitute DA.

It is called straight mapping when the associated data of all the defective blocks in one of the DAs are merely recorded in the DTB corresponding to the DA in the DT. Otherwise, it is called non-straight mapping.

Each of the DTBs further comprises a mapping flag 32 for indicating whether the corresponding SA is straight mapping or not. In the prior art, when determining whether the mapping flag is straight mapping, it is necessary to examine the address of the defective blocks in the DAs recorded in all entries 30 one by one. However, such method is very time-consuming.

SUMMARY OF THE INVENTION

It is therefore a primary objective of the present invention to provide a method and a system for updating the straight mapping flag in an optical recording medium to solve the above-mentioned problem.

In a preferred embodiment, the present invention provides a method for updating the straight mapping flag in an optical recording medium, such as a CD-RW. The optical recording medium comprises a plurality of sequentially arranged and numbered defect management areas (DMAs). Each of the DMAs comprises a data area (DA) and a spare area (SA). Both of the DA and the SA comprise a plurality of blocks to record digital data. Each of the blocks has a corresponding address for identification. The optical recording medium further comprises a defect table (DT) having a plurality of sequentially arranged and numbered defect table blocks (DTBs). Each of the DTBs corresponds to one of the DMAs and stores a straight mapping flag and a plurality of predetermined numbers of entries for recording. The entries correspond one by one to the plurality of blocks in the SAs. When the associated information of all the defective blocks in one of the DAs are merely recorded in the DTB corresponding to the DA in the DT, the straight mapping flag of the DTB is set to a first state, otherwise to a second state. The method for updating the straight mapping flag according to the present invention determines the examining sequence of the DTBs in the DT by a predetermined block-sequence determination procedure. According to the determined examining sequence, examine whether the DTB comprises any entries which are marked as recorded. Next examine the recorded entries in the DTB by performing a predetermined entry-examining procedure, so as to acquire the ID number of the associated DMA of the defective blocks in recorded entries. Finally, determines on the basis of the acquired ID number whether the corresponding straight mapping flag is updated to the second state.

The present invention uses a predetermined entry-examining procedure to examine the recorded entries in the DTBs, acquiring a starting and an ending area number of the defective blocks recorded in the recorded entries, and acquiring all the area numbers that fall within the range between the starting area number and the ending area number. Finally, update the corresponding straight mapping flags of the DTBs, corresponding to all the area numbers, to the non-straight mapping state one by one, except the DTB currently under examination. The present invention can save more times in comparison with the conventional method that must search the address in the entries one by one, and the present invention can also raise the accuracy of the straight mapping flag effectively.

These and other objectives of the present invention will no doubt become obvious to those of ordinary skill in the art after reading the following detail description of the preferred embodiment, which is illustrated in the various figures and drawings.

DETAILED DESCRIPTION OF THE PREFERRED EMBODIMENT

The present invention provides a system and a method for updating the straight mapping flag in an optical recording medium. The optical recording medium can be a CD-RW (Compact Disk-ReWritable).

Figure 1:
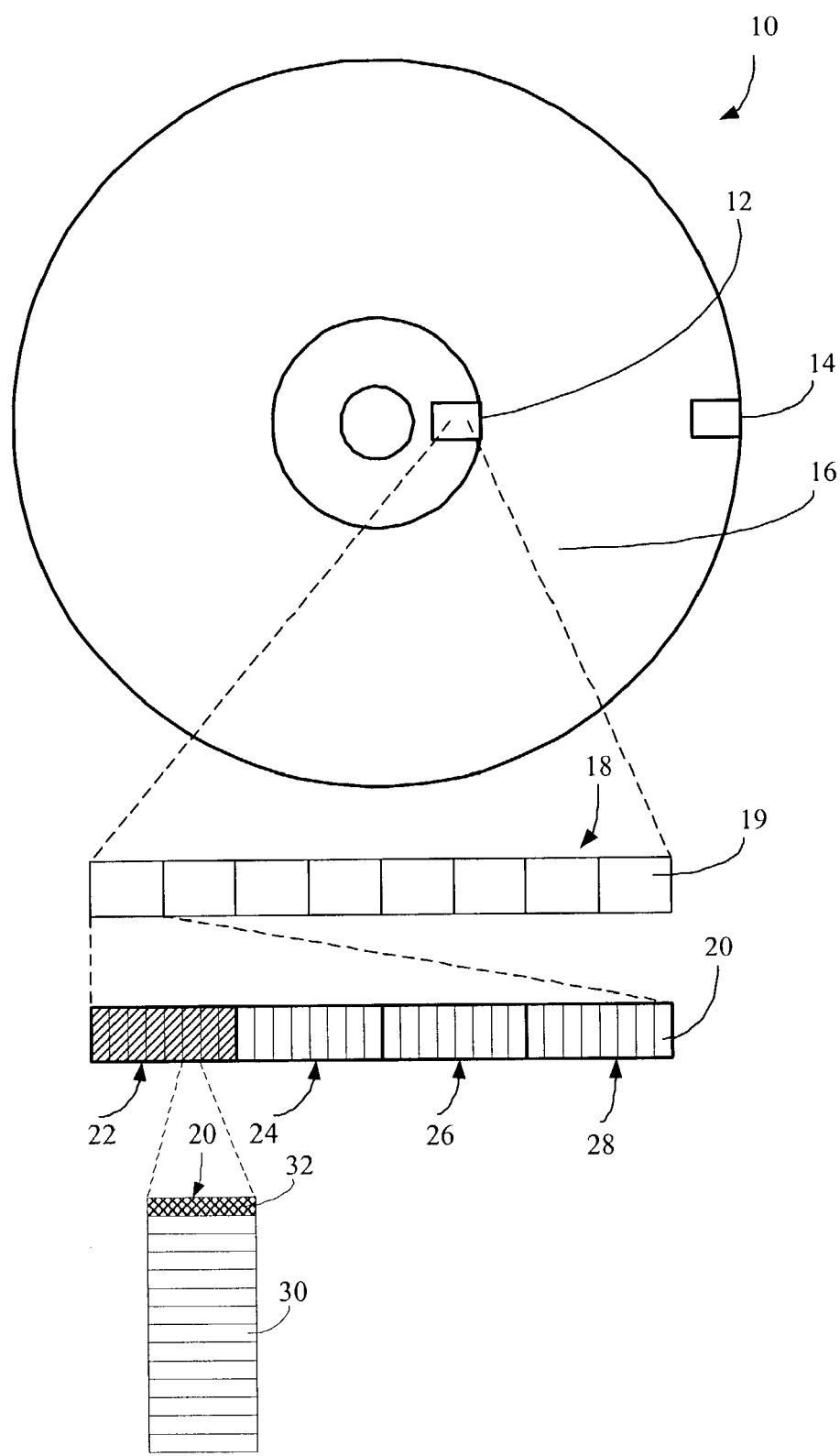
FIG. 1 is a schematic diagram of file arrangement for a conventional CD.
Figure 2:
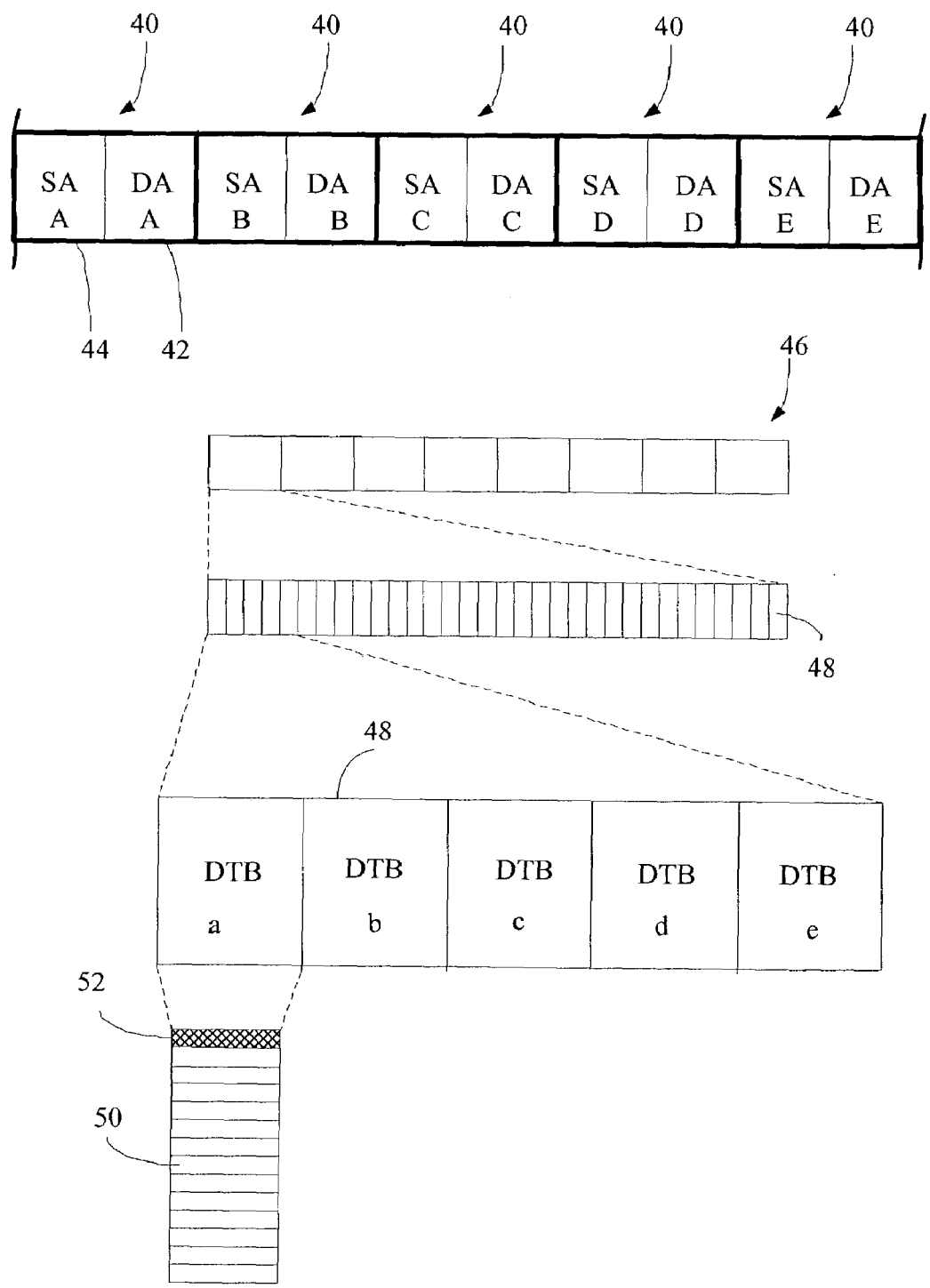
FIG. 2 is a schematic diagram of data recording blocks of a CD-RW according to the present invention.

Referring to FIG. 2, FIG. 2 is a schematic diagram of data recording blocks of a CD-RW according to the present invention. A formatted CD-RW comprises a plurality of defect management areas (DMAs) 40 and a defect table (DT) 46. The DMAs 40 are sequentially arranged, designated as A, B, C, D, and E in FIG. 2. Each of the DMAs 40 comprises a data area (DA) 42 and a spare area (SA) 44, both of the DA 42 and the SA 44 comprises a plurality of blocks to record digital data. Each of the blocks has a corresponding address for identification. The DT 46 comprises a plurality of defect table blocks (DTBs) 48. The DTBs 48 are sequentially arranged, designated as a, b, c, d, and e in FIG. 2.

Figure 3:
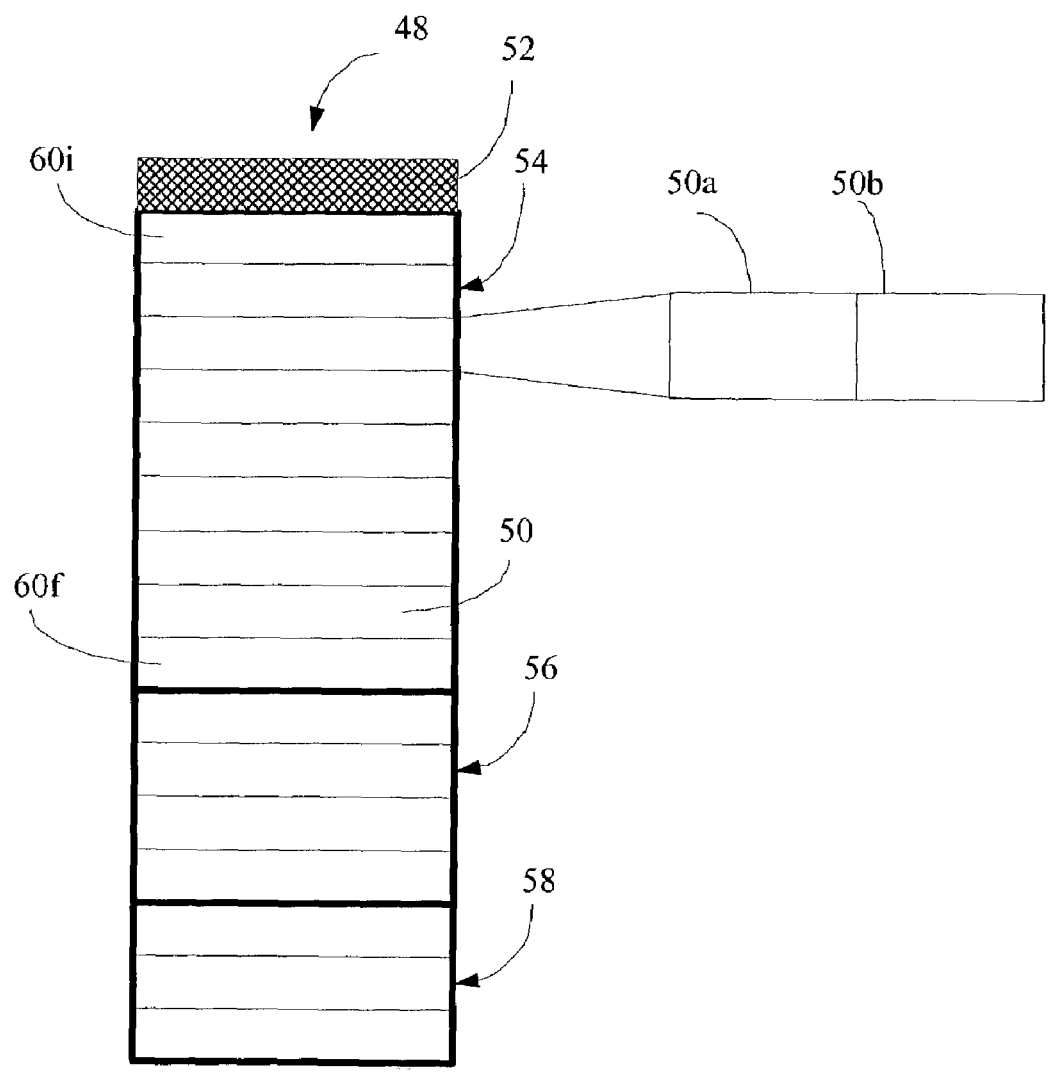
FIG. 3 is a schematic diagram of a defect table block according to the present invention method.

Referring to FIG. 3, FIG. 3 is a schematic diagram of a DTB 48 according to the present invention. Each of the DTBs 48 corresponds to one of the DMAs and stores a straight mapping flag 52 and a plurality of entries 50 for recording. The number of entries 50 is predetermined. The entries 50 correspond one by one to the plurality of blocks in the SAs. When a digital data that should be recorded in a predetermined block in one of the DAs is later recorded in a replacement block in one of the SAs due to the determination that the predetermined block in the DA is defective, an associated information is recorded in the entry 50 in one of the DTBs 48 in the DT 46. And the entry 50 is marked as recorded and sequentially arranged in the DTB 48.

Each entry 50 has 6 bytes, and is divided into two units 50a and 50b. The associated data recorded in the 3 bytes of the unit 50a is the address of the defective blocks. The associated data recorded in the 3 bytes of the unit 50b is the corresponding address of the replacement blocks. According to the address of the defective blocks, an ID number of the associated DMA comprising the detect block is identified.

According to the recording status of the block of the SA corresponded to the entries, the DTB 48 can be divided into three areas. The first area is the reallocation entry area 54, meaning that the replacement block corresponded to the entry have replaced the block indicated by the unit to be recorded with digital data. The second area is the free entry area 56, meaning that the corresponding replacement block has not recorded with digital data. The third area is the unusable entry area 58, meaning that the corresponding replacement block cannot be used to record with digital data.

In FIG. 3, when associated information of the defective block is newly added, the entries of the DTB is rearranged according to the address of the defective blocks recorded in the unit 50a of every entry 50. The sequentially rearranged recorded entries can define a starting recorded entry 60i and an ending recorded entry 60f. A starting and an ending area numbers are consequently defined according to the identified ID numbers of the associated DMAs from the address of the defective blocks recorded in the entry 50.

When the associated information of all the defective blocks in one of the DAs are merely recorded in the DTB corresponding to the DA in the DT, the straight mapping flag 52 of the DTB 48 is set to a first state, straight mapping; otherwise a second state, non-straight mapping. The straight mapping flag 52 is a one-byte entry, wherein one bit is used to indicate whether the associated information of the defective blocks in the corresponding DAs are merely recorded in the DTB corresponding to the DA in the DT, 1 for straight mapping and 0 for non-straight mapping. When a DTB is straight mapping, the substitute situation can be known by directly searching the DTBs corresponded to the DA.

Figure 4:
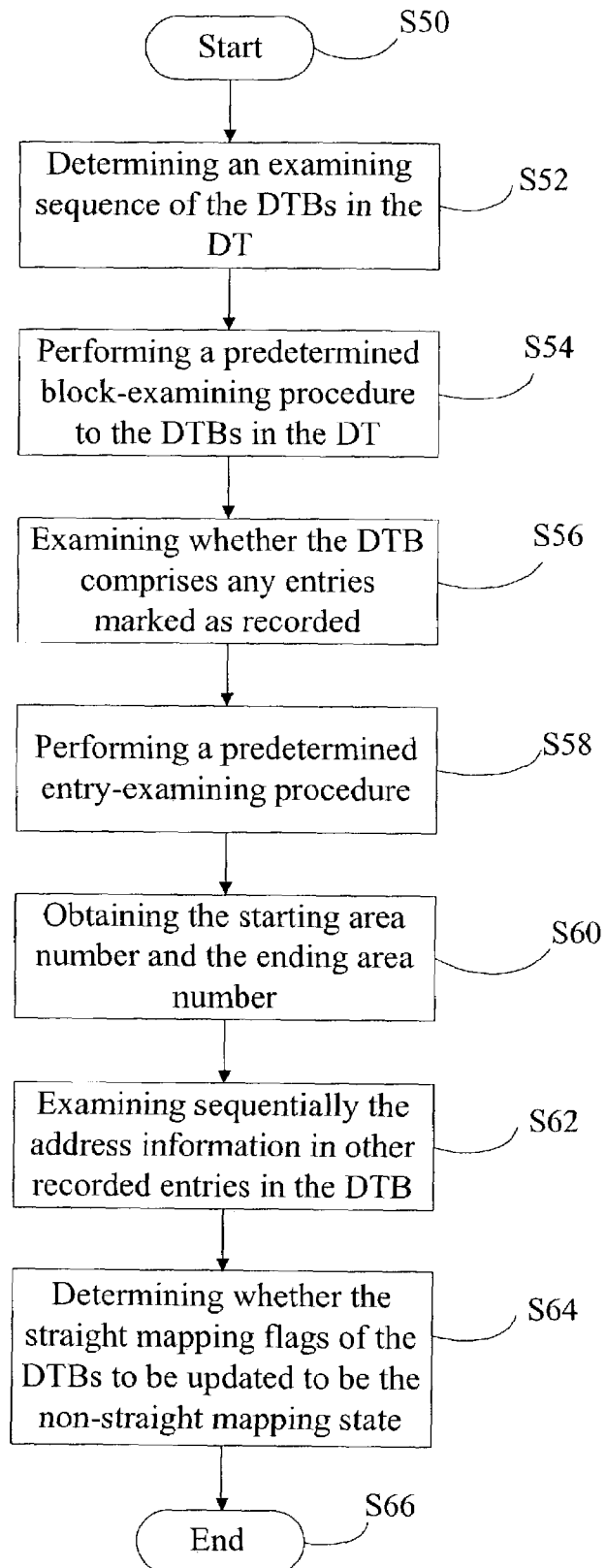
FIG. 4 is a flow chart of the updating method according to the present invention.

Referring to FIG. 4, FIG. 4 is a flow chart of the updating method according to the present invention. When the optical recording medium has not been recorded any digital data, all the straight mapping flags recorded in the DTBs are initially set to the first state. And when there is no recorded entry in the DTB, the state of the straight mapping flag recorded in the DTB is not changed, and the next DTB in the DT is continuously examined according to an examining sequence. The updating method comprises the following steps:

Step S50: start.

Step S52: determining an examining sequence of the DTBs in the DT according to a predetermined block-sequence determination procedure which is according to the numbering sequence of the DTBs.

Step S54: performing a predetermined block-examining procedure to the DTBs in the DT one by one according to the examining sequence determined in step S52.

Step S56: examining whether the DTB comprises any entries marked as recorded.

Step S58: examining the recorded entries in the DTB by performing a predetermined entry-examining procedure, so as to acquire the associated information of the defective blocks in recorded entries.

Step S60: obtaining the starting area number and the ending area number respectively from the address recorded in the DTB currently under examination.

Step S62: examining sequentially the address in other recorded entries in the DTB to find out all the area numbers falling within the range between the starting area number and the ending area number.

Step S64: for all the area numbers previously found, determining whether the corresponding straight mapping flags of the DTBs to be updated to the non-straight mapping state.

Step S66: End.

In step S64, it is for all the area numbers found in step S62 to update the corresponding straight mapping flags of the DTBs to the second state one by one, except the DTB currently under examination.

Refer to FIG. 2 to describe the updating method of the present invention. The DTBs a, b, c, d, and e correspond to the DMAs A, B, C, D, and E, respectively. After starting the updating method, according to the numbering sequence of the DTBs, perform the predetermined block-examining procedure to the DTBs one by one, starting from the DTB a to b, c, d, and e in sequence. Examine whether the DTB a comprises any entries 50 marked as recorded. If the DTB a does not comprise any entries 50 marked as recorded, do not change the state of the straight mapping flag corresponded to the DMA a then examine the DTB b.

As shown in FIG. 2, examine the recorded entries 50 in the DTB b, so as to acquire the associated information of the defective blocks in the recorded entries. Obtain a starting area number and an ending area number respectively from the address recorded of the associated information recorded in the recorded entries 50 of the DTB b. If the address recorded in the DTB b indicates that the starting area number is DA B and the ending area number is DA E, examine sequentially the address in other recorded entries in the DTB b. By the address information, find out all the area numbers falling within the range between the starting area number B and the ending area number E. If the result of the examination to the DTB b has the address of the blocks in the DA C falling within the range between the starting and ending areas, update one by one the straight mapping flags 52 corresponded to the DMA C and E, except the DTB b that currently under examination. Update the straight mapping flag 52 to 0, i.e. non-straight mapping.

According to the definition, it is straight mapping when the associated information of all the defective blocks in one of the DAs is merely recorded in the DTB corresponding to the DA in the DT. Therefore, if the information of the defective blocks in the DAs C and E are merely recorded in the SAs C and E, it is straight mapping. But some data of the DAs C and E are found in the SA B, meaning that the DMAs C and E are non-straight mapping. Therefore, change the straight mapping flags corresponded to the DAs C and E to non-straight mapping. As for the DMA B, only when the recorded entries of other DTBs such as DTBs c, d, and e are found that the entries comprise the address of the DA B during performing the examining sequence, the straight mapping flag corresponded to the DA B can be updated into 0, non-straight mapping. If the recorded entries of the DTBs c, d, and e do not comprise any address of the DA B, then the straight mapping flag of the DA B will not be updated to the second state 0, and remain in the first state 1 as straight mapping.

Figure 5:
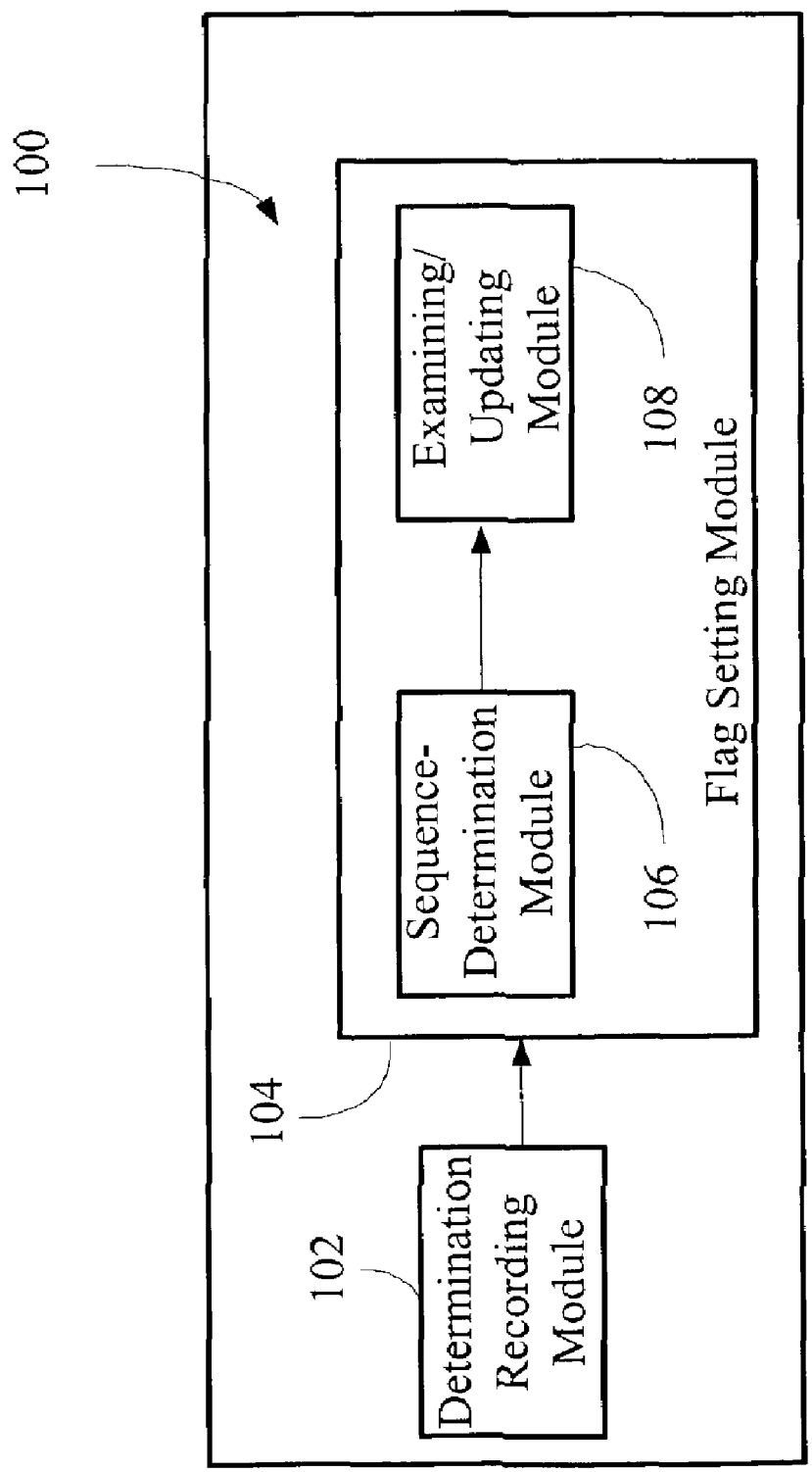
FIG. 5 is a functional block diagram of the system for updating the straight mapping flag according to the present invention.

Referring to FIG. 5, FIG. 5 is a functional block diagram of the system 100 for updating the straight mapping flag according to the present invention. The updating system 100 can be a CD-RW drive, and the updating system 100 comprises a determination recording module 102 and a flag setting module 104. When a digital data that should be recorded in a predetermined block in one of the DAs 42 is later recorded in a replacement block in one of the SAs 44 due to the determination that the predetermined block in the DA is defective, the determination recording module 102 records the associated information, such as the address of the defective block . . . etc., in the entry 50 in one of the DTBs 48 in the DT 46, and marks the entry as recorded and sequentially arranging the entry in the DTB 48.

The flag setting module 104 is used to set the states of the straight mapping flag 52 recorded in the DTB 48. For example, when the associated information of all the defective blocks in the DAs B are merely recorded in the DTB b corresponding to the DA B in the DT 46, the straight mapping flag of the DTB b is set to a first state 1 to represent straight mapping; otherwise a second state 0 to represent non-straight mapping. The flag setting module 104 comprises a sequence-determination module 106 and an examining/updating module 108. The sequence-determination module 106 is used to determine the examining sequence of the DTB 48 in the DT 46 in the updating procedure of the straight mapping flag according to a predetermined block-sequence determination procedure. The examining/updating module 108 is used to perform a predetermined block-examining procedure to the DTBs 48 in the DT one by one according to the determined examining sequence.

In predetermined block-examining procedure, the examining/updating module 108 first examine whether the DTB 48 comprises any entries that are marked as recorded, then examine the recorded entries in the DTB by performing a predetermined entry-examining procedure, so as to acquire the associated information of the defective blocks in recorded entries. The associated information recorded in the entries comprises the address of the defective block in the DA 42. Then acquire a starting area number and an ending area number respectively. The examining/updating module 108 examines sequentially the address in the other recorded entries in the DTB 48, and finds out all the area numbers that fall within the range between the starting area number and the ending area number. Finally, the examining/updating module 108 updates the corresponding straight mapping flags of the DTBs to the second state one by one by all the area numbers, except the DTB currently under examination.

In contrast to the conventional method of setting the straight mapping flag, the present invention uses a predetermined entry-examining procedure to examine the recorded entries in the DTBs, acquiring a starting and an ending area number of the defective blocks recorded in the recorded entries, and acquiring all the area numbers that fall within the range between the starting area number and the ending area number. Finally, update the corresponding straight mapping flags of the DTBs, corresponding to all the area numbers, to the non-straight mapping state one by one, except the DTB currently under examination. The present invention can save more times in comparison with the conventional method that must search the address in the entries one by one, and the present invention can also raise the accuracy of the straight mapping flag effectively.

With the examples and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for updating a straight mapping flag of a data area stored in an optical recording medium, the optical recording medium comprising a plurality of sequentially arranged and numbered defect management areas (DMAs), each of the DMAs comprising a data area (DA) and a spare area (SA), both of the DA and the SA comprising a plurality of blocks to record digital data, each of the blocks having a corresponding address for identification, and the optical recording medium further comprising a defect table (DT) having a plurality of sequentially arranged and numbered defect table blocks (DTBs), each of the DTBs corresponding to one of the DMAs and storing a straight mapping flag and a plurality of predetermined numbers of entries for recording, the entries corresponding one by one to the plurality of blocks in the SAs; wherein when a digital data that should be recorded in a predetermined block in one of the DAs is later recorded in a replacement block in one of the SAs due to the determination that the predetermined block in the DA is defective, associated information is recorded in the entry of one of the DTBs in the DT, and the entry is marked as recorded and sequentially arranged in the DTB; and wherein when the associated information of all the defective blocks in one of the DAs are merely recorded in the DTB corresponding to the DA in the DT, the straight mapping flag of the DTB is set to a first state, otherwise a second state; the updating method comprising the following steps of:

(A) determining an examining sequence of the DTBs in the DT according to a predetermined block-sequence determination procedure; and (B) performing a predetermined block-examining procedure to the DTBs in the DT one by one according to the determined examining sequence, the block-examining procedure comprising:

(B1) examining whether the DTB comprises any entries that are marked as recorded;

(B2) examining the recorded entries in the DTB by performing a predetermined entry-examining procedure, so as to acquire the associated information of the defective blocks in recorded entries; and (B3) determining on the basis of the acquired associated information whether the corresponding straight mapping flag is to be updated to the second state.

2. The updating method of claim 1, wherein the associated information recorded in the entries comprises the address data of the defective block and of the corresponding replacement block, and according to the address of the defective block, an ID number of the associated DMA comprising the defective block is identified.

3. The updating method of claim 2, wherein when associated information of the defective block is newly added, the entries of the DTB are rearranged according to the address of the defective blocks.

4. The updating method of claim 3, wherein in the rearranged recorded entries, a starting and an ending recorded entry are defined, and a starting and an ending area number are consequently defined according to the identified ID numbers of the associated DMAs from the address of the defective blocks.

5. The updating method of claim 4, wherein the predetermined entry-examining procedure comprising:
obtaining the starting area number and the ending area number respectively from the address recorded in the DTB currently under examination;
examining sequentially the address recorded in the other recorded entries in the DTB, so as to find out all the area numbers that fall within the range between the starting area number and the ending area number; and
for all the previously found area numbers, updating the corresponding straight mapping flags of the DTBs to the second state one by one, except the DTB currently under examination.

6. The updating method of claim 1, wherein the predetermined block-sequence determination procedure determines the examining sequence of the DTBs in the DT according to the numbering sequence of the DTBs.

7. The updating method of claim 1, wherein, when the optical recording medium has not been recorded any digital data, all the straight mapping flags recorded in the DTBs are initially set to the first state.

8. The updating method of claim 1, wherein, when there is no recorded entry in the DTB, the state of the straight mapping flag recorded in the DTB is not changed, and according to the examining sequence, the next DTB in the DT is continuously examined.

9. The updating method of claim 1, wherein the optical recording medium is a CD-RW (Compact Disk-Rewritable).

10. A system for updating a straight mapping flag of a data area stored in an optical recording medium, the optical recording medium comprising a plurality of sequentially arranged and numbered defect management areas (DMAs), each of the DMAs comprising a data area (DA) and a spare area (SA), both of the DA and the SA comprising a plurality of blocks to record digital data, each of the blocks having a corresponding address for identification, and the optical recording medium further comprising a defect table (DT) having a plurality of sequentially arranged and numbered defect table blocks (DTBs), each of the DTBs corresponding to one of the DMAs and storing a straight mapping flag and a plurality of predetermined numbers of entries for recording, the entries corresponding one by one to the plurality of blocks in the SAs, the updating system comprising:
a determination recording module, when a digital data that should be recorded in a predetermined block in one of the DAs is later recorded in a replacement block in one of the SAs due to the determination that the predetermined block in the DA is defective, the determination recording module recording associated information in the entry in one of the DTBs in the DT, and marking the entry as recorded and sequentially arranging the entry in the DTB; and
a flag setting module for setting the states of the straight mapping flag recorded in the DTB, when the associated information of all the defective blocks in one of the DAs are merely recorded in the DTB corresponding to the DA in the DT, the straight mapping flag of the DTB being set to a first state, otherwise a second state; the flag setting module comprising:
a sequence-determination module for determining an examining sequence of the DTBs in the DT according to a predetermined block-sequence determination procedure; and
an examining/updating module for performing a predetermined block-examining procedure to the DTBs in the DT one by one
according to the determined examining sequence;
wherein, the examining/updating module performing the block-examining procedure by the following steps:
examining whether the DTB comprises any entries that are marked as recorded;
examining the recorded entries in the DTB by performing a predetermined entry-examining procedure, so as to acquire the associated information of the defective blocks in recorded entries; and
updating the straight mapping flag to the second state based on the acquired associated information.

11. The updating system of claim 10, wherein the associated information recorded in the entries comprises the address of the defective block and of the corresponding replacement block, and according to the address of the defective block, an ID number of the associated DMA comprising the defective block is identified.

12. The updating system of claim 11, wherein when associated information of the defective block is newly added, the entries of the DTB is rearranged according to the address of the defective blocks.

13. The updating system of claim 12, wherein in the rearranged recorded entries, a starting and an ending recorded entry are defined, and a starting and an ending area number are consequently defined according to the identified ID numbers of the associated DMAs from the address of the defective blocks.

14. The updating system of claim 13, wherein the predetermined entry-examining procedure comprising:
obtaining the starting area number and the ending area number respectively from the address recorded in the DTB currently under examination;
examining sequentially the address in the other recorded entries in the DTB, so as to find out all the area numbers that fall within the range between the starting area number and the ending area number; and
for all the previously found area numbers, updating the corresponding straight mapping flags of the DTBs to the second state one by one, except the DTB currently under examination.

15. The updating system of claim 10, wherein the predetermined block-sequence determination procedure determines the examining sequence of the DTBs in the DT according to the numbering sequence of the DTBs.

16. The updating system of claim 10, wherein, when the optical recording medium has not been recorded any digital data, the examining/updating module initially sets all the straight mapping flags in the DTBs to the first state.

17. The updating system of claim 10, wherein, when there is no recorded entry in the DTB, the examining/updating module does not change the state of the straight mapping flag recorded in the DTB, and continuously examines the next DTB in the DT according to the examining sequence.

18. The updating system of claim 10, wherein the optical recording medium is a CD-RW (Compact Disk-Rewritable).

* * * * *